2,909,664

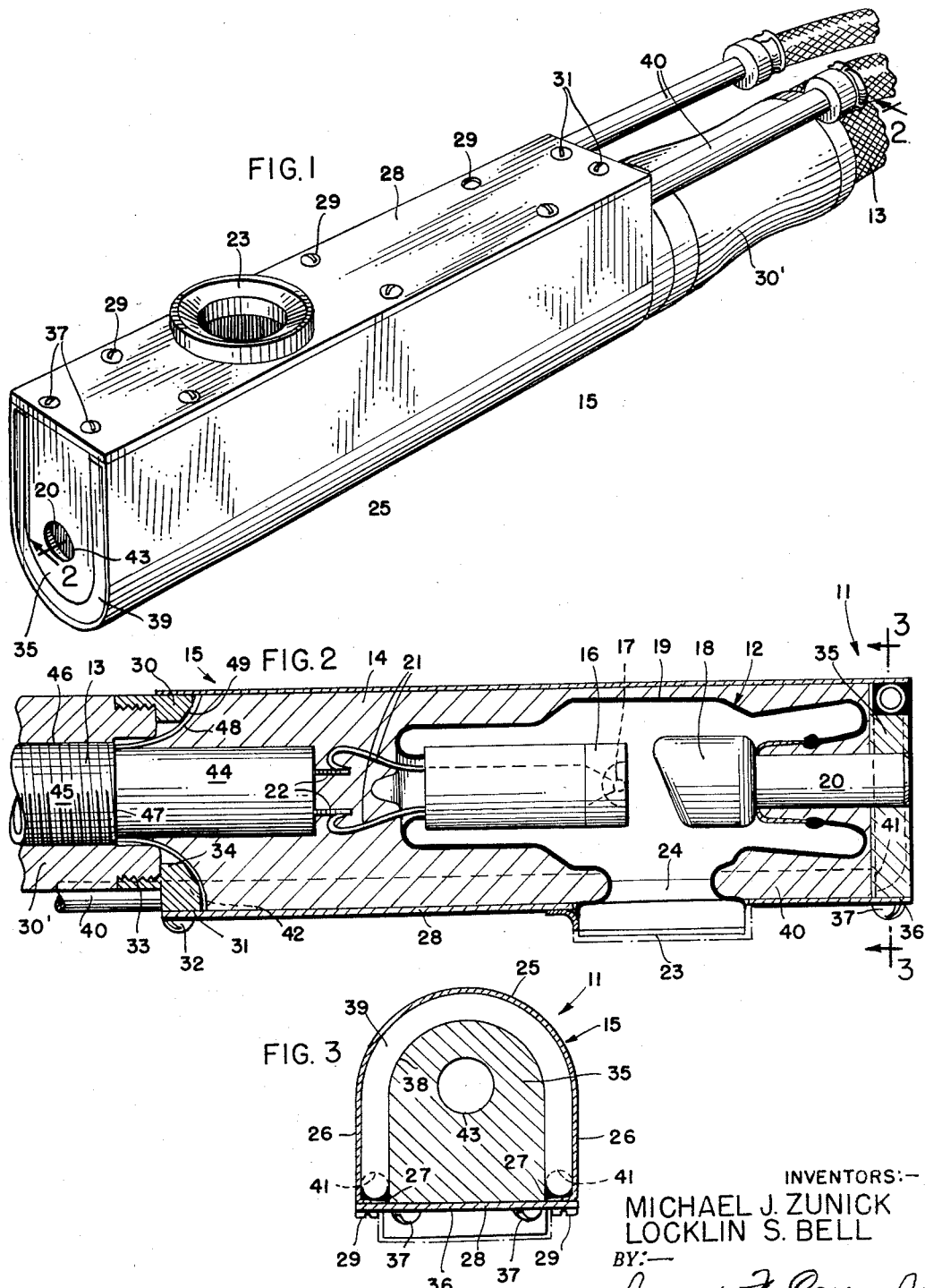

X-RAY APPARATUS

Michael J. Zunick, Greenfield, and Locklin S. Bell, Milwaukee, Wis., assignors to General Electric Company, a corporation of New York Application December 12, 1955, Serial No. 552,473

2 Claims. (Cl. 250—90)

The present invention relates in general to X-ray apparatus and has more particular reference to an improved shock proof X-ray generating device and method of making the same.

An important object of the invention is to provide an X-ray generating tube sealed together with a high voltage power supply cable to form a relatively small, compact unit, providing an X-ray generating device of unusually high power rating in proportion to overall size.

Another important object is to provide a unit of the character mentioned comprising an X-ray generating tube and associated high voltage power supply cable embedded in a body of insulating material within a container of electrical conducting material forming a grounded casing for the unit, whereby the device is of substantially shock-proof character; a further object being to embed the tube and the interconnected end of its power supply cable in a massive block of insulating material whereby, in addition to small size, the unit is of rugged character and highly resistant to damage through mechanical impact; a further object being to embed the tube and the tube connected cable end by submerging the same in a liquid resin of the sort adapted to be irreversibly solidified, and then converting the resin to its solid condition; a further object being to apply a cold molding resin in its liquid stage in position enveloping the tube and connected cable end and to convert the resin to its solid state substantially at normal atmospheric pressure by adding a suitable polymerizing agent to the liquid resin.

Another important object is to provide a unit of the character mentioned that is easy to manufacture, has improved heat dissipating characteristics and is completely insulated by virtue of the envelopment of the generating tube and associated power supply cable in a body of insulation within a grounded container.

Another important object is to envelope an electron flow device, such as an X-ray generating tube, together with the tube connected end of its associated power supply cable, in a body of insulating material preferably enclosed within a housing containing conduits for the circulation of a cooling fluid in heat exchange relation with respect to the generating tube.

Briefly stated, in accordance with a preferred aspect of the invention, an X-ray generating tube, electrically connected with an associated cable, may be enclosed within a housing or casing containing a body of insulating material, such as epoxy resin, applied as by pouring the same into the container and then causing it to solidify about the tube and its associated cable, preferably at or near normal atmospheric temperature, the casing being preferably formed of electrical conducting material, such as sheet steel, and hence being adapted to be easily grounded to shockproof the equipment, the casing being formed with a window opening at which a portion of the generating tube may be exposed to facilitate the emission of X-rays outwardly of the casing.

The invention also contemplates the provision of conduits, within the casing in position embedded in the tube enveloping body of insulation, for the circulation of a cooling fluid, such as water, in heat exchange relationship with respect to the embedded tube and more particularly with respect to the anode element thereof, said anode element having a heat transmitting portion extending outwardly of the tube and connected with a heat dissipating plate disposed in position forming an end wall of the casing in direct heat exchange contact with a portion of said conduit.

The foregoing and numerous other important objects, advantages and inherent functions of the invention will be apparent as the same is more fully understood from the following description, which, taken in connection with the accompanying drawings, discloses a preferred embodiment of the invention.

Referring to the drawings:

Fig. 1 is a perspective view of an X-ray generating device embodying the present invention;

Fig. 2 is a sectional view taken substantially along the line 2—2 in Fig. 1; and Fig. 3 is a sectional view taken substantially along the line 3—3 in Fig. 2.

To illustrate the invention, the drawings show an X-ray unit 11 comprising a ray generating tube 12 and an insulated cable 13 through which electrical energy may be supplied for the operation of the generating tube, the cable being electrically connected at one end with the tube. The tube 12 and the tube connected end of the cable 13 may be embedded in an enveloping body of insulating material 14, enclosed within a housing or casing 15, which is adapted to be electrically grounded.

While the invention is not necessarily limited to any particular form, construction or configuration of the ray generating tube 12, the same may comprise a cathode 16 embodying an electron emitting element 17, and an anode 18 providing an electron target mounted within a sealed and evacuated envelope 19, which serves to enclose and support the anode and cathode in spaced apart facing relationship within the envelope. To this end, the anode and cathode may be conventionally mounted upon and sealed to re-entrant envelope portions at the opposite ends of the envelope, and the anode may be formed with a stem 20, comprising electrical and thermal conducting material and extending outwardly of the anode carrying end of the envelope, said stem being mechanically and electrically connected with the housing on the housing 15. The electron emitting element of the cathode may comprise a filament suitably supported in the cathode structure and provided with conductors 21 extending outwardly of the envelope, at its cathode carrying end, through suitable seals, such conductors being electrically connected with corresponding conductors 22 of the cable 13, whereby the filament may be electrically connected through the cable with a suitable source of electrical power to energize the filament for electron emission.

It will, of course, be understood that the ray generating tube 12 may be caused to function for the production of X-rays, at the cathode facing surface of the anode 18, by energizing the element 17 for electron emission, as by connecting the cable conductors 22 with a suitable power source, while simultaneously applying electron driving potential between the cathode and the anode, as by connecting the anode stem 20 and one of the cable conductors 22 with a suitable source of electron driving potential. The generator tube thus may be caused to produce X-rays at the cathode facing surface of the anode as the result of impingement thereon of electrons emitted by the cathode element 17 and impelled toward and caused to impinge upon the target surface of the anode under the influence of the operating potential applied between the cathode element and the anode.

X-rays generated as a result of electron impingement on the target surface of the anode may pass thence outwardly of the envelope 19 through a ray transmitting window 23 of any suitable character. As shown, the transmitting window may comprise a disc of beryllium or other ray translucent material mounted, as in the manner taught in U.S. Letters Patent No. 2,340,362, of February 1, 1944, on the invention of Zed J. Atlee and Howard W. Brackney in Window Construction for X-ray Tubes, the window being supported in an opening formed laterally in the envelope 19, as at a necked envelope portion 24.

The casing or housing 15 may conveniently comprise a medially curved sheet metal element 25 forming a trough and providing spaced apart wall portions 26 having inwardly extending terminal flanges 27, and a preferably sheet metal cover plate 28 extending between and removably secured to the inturned flanges 27 in any suitable or preferred fashion, as by means of the fastening screws 29. The housing may also comprise a plate 30 of steel or other suitable material forming an end wall, the plate being formed to fit within an end of the sheet metal trough element 25. The end plate 30 may have a flat edge 31 adapted to underlie an end of the cover plate 28, which may be removably secured to the end plate 30 at the edge 31 thereof in any suitable or preferred fashion, as by means of fastening screws 32. The peripheral edges of the end plate 30, other than the cover mounting edge 31, may be welded, brazed, or otherwise secured within the housing element 25 at an end thereof. The end plate 30 may be provided with an integral, internally threaded sleeve portion 33 defining an opening 34 through which the end of the cable 13 may extend into the housing 15, preferably in coaxial alinement with the X-ray generating tube 12, the sleeve portion 33 serving to threadingly receive and detachably mount a cable bushing 30' on the end plate 30 in position encircling the cable 13.

The housing 15, at the end thereof remote from the cable receiving end plate 30, may be provided with a closure plate 35 of copper or other suitable electrical and thermal conducting metal, said closure plate having a peripheral edge shaped to snugly fit within the curved sheet metal trough element 25, at the end thereof, said plate 35 having a flat edge 36 formed to underlie an end edge of the cover plate 28 which may be secured to the plate 35 at the edge 36 thereof, as by means of fastening screws 37.

The peripheral edge portions of the plate 35, other than the edge 36, may be formed with a groove 38 adapted to receive the medial curved portions 39 of a conduit or pipe of copper or other suitable metal, said medial portions extending in the groove 38 between the opposite ends of the edge 36. The conduit or pipe may have opposite end portions 40 extending respectively from the opposite ends of the curved portion 39, through openings 41 communicating the opposite ends of the groove 38 with the interior of the housing 15 immediately behind the inturned flanges 27 of the trough element 25. The opposite ends 40 of the pipe or conduit may extend from the openings 41, behind the flanges 27, to the end of the housing 15 remote from the closure plate 35, and may thence project outwardly of the housing adjacent the cable 13, through suitable openings 42 formed in the end plate 30. The medial curved pipe portions 39 are preferably soldered or brazed in the groove 38 of the closure plate, whereby to integrate the pipe with the plate at the edges thereof, so that the same may be cooled by the circulation of a cooling fluid, such as water, through the pipe when the X-ray generating tube is in operation.

The closure plate 35 may be formed with an opening 43 in coaxial alinement with respect to the X-ray generating tube, said opening 43 being sized to snugly receive the outwardly projecting end of the anode stem 20. Any other suitable or preferred expedient may of course be employed for mounting the electron flow device in the housing 15 and for electrically and thermally connecting the stem 20 therewith.

The device may be assembled by first soldering or brazing the cooling tube portions 39 in the groove 38, and then soldering or brazing the end plate 30 and the closure plate 35 respectively in the opposite ends of the element 25, with the opposite end portions 40 of the cooling tube extending beneath the flanges 27 and outwardly of the housing through the openings 42 formed in the cable carrying end wall 30. Thereafter, the X-ray generating tube 12 may be mounted within the element 25 with its projecting anode stem 20 snugly seated in the opening 43, to thereby support the generating tube in mounted position within the element 25. Thereafter, the bushing 30' may be mounted in the end wall 30 and the end of the cable 13 then assembled through said bushing and the opening 34 in the end plate 30.

The cable may comprise the conductors 22 extending longitudinally thereof and enclosed within an elongated body 44 of insulating material, preferably of somewhat flexible consistency, the cable embodying a flexible protective sheath 45 of electrical conducting material, which may conveniently comprise woven metal wire forming a sleeve extending longitudinally of the cable and enclosing the body of insulating material 44, said sheath being adapted for connection with ground. If desired, an outer covering layer of woven cotton 46 may be applied in position enclosing the sheath 45. At the end of the cable, the insulation 44 may be removed to expose the terminal ends of the conductors 22 for electrical connection with the conductors 21 of the X-ray tube.

Since the cable is adapted for high tension electrical circuit forming purposes, it is necessary to provide means at or adjacent the ends of the cable for maintaining permissible voltage gradient conditions between the exposed ends of the cable conductors 22 and the adjacent end of the ground connected sheath 45. For such purpose, the ground connected sheath may be cut away or removed to terminate, as at 47, spaced a substantial distance from the exposed terminal ends of the conductors 22. A bell shaped collar 48 of electrical conducting material, such as sheet copper, or other suitable metal, may be applied to the cable at the cut back end of the sheath 45 and in electrical contact therewith. In that connection, the sleeve 48, at one end, may extend beneath and be soldered to the end of the metallic sheath 45. At its other end, the sleeve 48 may be soldered or brazed or otherwise electrically connected, as at 49, to the inner end of the plate 30, to thereby ground the cable sheath 45 upon the housing element 25. It will be seen, also, that the collar 48, when in mounted position, will close the opening 34 around the cable 13.

In accordance with the present invention, a dense body of insulation 14 is applied as a solidified mass within the housing member 25 in position surrounding the cable insulation 44 from the grounding sleeve 48 toward the terminal end of the insulation, to thereby obtain a desired or required voltage gradient along the cable between the end of the sheath 45 and the exposed conductors 22. The insulation 14 also envelopes the interconnected conductors 21 and 22, as well as the X-ray generating tube 12, excepting only the ray emitting window structure and the end of the stem 20 which is mounted in the end wall opening 43.

The present invention, moreover, contemplates the application of the insulation, in liquid condition, in the housing member 25, in position surrounding the generating tube 12 and the tube connected end of the cable, and the subsequent solidification of the insulating material, prior to the application of the cover plate 28. The present invention also contemplates the employment of a so called cold molding resin as an insulating medium for the envelopment of the generating tube 12 and the tube connected end portions of the cable 13. Cold molding resins are adapted for solidification, as the result of irreversible polymerization under but slight, if any pressure, at temperatures of the order of normal atmospheric temperature, or slightly higher. To this end, the insulating material 14 preferably comprises epoxy resin, containing subdivided mica or other electrical insulating substance, as a filler. Alternately, the insulating material may comprise thiokol resin, thiokol-epoxy co-polymer resins, or polyurethane resin; and unsaturated polyester resins may be employed, if desired.

Unsaturated polyesters comprise condensation products of unsaturated dibasic acids with glycols. Epoxy resins comprise the reaction products of hydroxyl containing components with epichlorohydrin components. Epoxy resin may be produced in liquid condition at temperatures of the order of normal room temperature; and thereafter the resin may be irreversibly solidified, at normal room temperature, by mixing the resin, in liquid condition, with a suitable polymerizing agent, such as diethyltetramine or triethyltetramine, or other poly-functional amines. Phthalic anhydride or malic anhydride and other acid anhydrides may also be employed to polymerize epoxy resins. Acid anhydrides are usually used to polymerize resins which are solid at normal atmospheric temperatures and which require temperatures of the order of 100° C. to liquify the same before adding the polymerizing agent.

The invention, however, is not necessarily limited to the use of any specific insulating material 14. Indeed, it is within the contemplation of the present invention that the insulating material 14 may comprise a suitable liquid or gaseous medium, in which case suitable means may be provided for rendering the housing 15 gas or liquid-tight, as by sealingly gasketing the edges of the cover 28 and by providing suitable sealing means peripherally of the window structure of the ray generating tube, in the cover opening in which said window extends.

Prior to the assembly of the ray generating tube 12 in mounted position within the housing 15, the same is preferably coated with one or more layers of vibration and shock resistant insulating material, such as silicone rubber. Such coating or coatings may be applied by immersing the ray generating tube, except for the window 23 and the terminal end of the anode stem 20, in silicone rubber material, such as Silastic Compound Number 6–126, a compound manufactured by Dow Corning Corporation, at Midland, Michigan, and by then thoroughly baking the layer at a temperature of the order of 125° C. for a period of the order of 60 minutes. Alternately, the layer may be allowed to dry in air at normal atmospheric temperature. If desired, an additional or overcoat layer comprising Silastic Compound Number 6–127, a compound manufactured by Dow Corning Corporation, at Midland, Michigan, may then be applied upon the undercoat layer and baked or air dried in situ. Such resilient layer or layers aid in preventing breakage of the ray generating tube as the result of thermally induced mechanical stresses when the tube is in operation.

It will be seen from the foregoing that the device of the present invention essentially comprises a high voltage cable ending and an X-ray generating tube sealed together in a single grounded container. By enveloping the cable ending and the tube in a suitable solid insulating material, the structure is effectively constituted as a single manufacturing unit or component. In addition to small size, the cast unit is of rugged character, it embodies effective heat dissipating means and is easy to manufacture. The elimination of circumambient air immediately around the tube and the high voltage cable ending permits the device to have unusually high voltage rating in proportion to size.

It is thought that the invention and its numerous attendant advantages will be fully understood from the foregoing description, and it is obvious that numerous changes may be made in the form, construction and arrangement of the several parts without departing from the spirit and scope of the invention, or sacrificing any of its attendant advantages, the form herein disclosed being a preferred embodiment for the purpose of illustrating the invention.

The invention is hereby claimed as follows:

1. Electronic apparatus comprising a high tension electron flow tube embodying a cathode, a cooperating anode, and an envelope containing the same, a support stem connected with said anode and extending outwardly of said envelope at an end thereof, cathode energizing conductors electrically connected with said cathode within and extending outwardly of said envelope at the opposite end thereof, a coating of silicone rubber forming an elastic covering upon the outer surfaces of the envelope, a cable having an end terminating adjacent said tube and embodying conductor means electrically connected with said cathode conductors, a trough of resilient sheet metal forming an electrical conducting housing enclosing said tube, the end of said cable and the electrical connections of its conductor means with said cathode conductors, said housing comprising end walls secured in the opposite ends of said trough, including an anode supporting and cooling end wall and a cable mounting end wall, said anode supporting end wall being formed with an opening for snugly receiving said support stem and a duct encircling said opening, conduit means connected with said duct and extending from the duct containing end wall through the housing and outwardly thereof through the other end wall, said other end wall being formed with an opening for receiving said cable therethrough, said cable outwardly of said housing being formed with a sheath of electrical conducting material, a conically flared collar of electrical conducting material electrically connected at one end with said sheath and at the other with said cable receiving end wall at the opening therein, to thereby close said opening and ground the cable sheath on said housing, a synthetic organic resin in cured condition forming a solid body within said housing in position enveloping and embedding the entire envelope of said flow device, the cable end within said housing and the electrical connections of the cable conductor means with said cathode conductors, and a removable cover plate sealed at its opposite ends on said end walls and along its sides to the opposite sides of said trough.

2. Electronic apparatus comprising a high tension electron flow tube embodying an anode, a cooperating cathode, an envelope containing the anode and cathode and cathode energizing conductors extending outwardly of the envelope, a cable having an end terminating adjacent said tube and embodying a sheath of electrical conducting material and cable conductors electrically connected with the cathode energizing conductors, a housing of electrical conducting material enclosing said tube, the end of said cable and the connections of its conductors with the cathode conductors, said cable extending through an opening in said housing and outwardly thereof, a conical collar of electrical conducting material on and surrounding said cable in said opening, said collar having a neck portion snugly embracing said cable and electrically connected with said sheath, said collar having an outwardly flared skirt forming a peripheral portion electrically connected with the housing at said opening to thereby close the same around the cable and ground the cable sheath on the housing, and a synthetic organic resin in cured condition forming a solid body within the housing and said conical collar in position enveloping and embedding the tube, the cable end and the connections between the cable and cathode conductors.

References Cited in the file of this patent

UNITED STATES PATENTS 1,907,640    Zeyss et al. _____ May 9, 1933

(Other references on following page)

UNITED STATES PATENTS

| | | |
|---|---|---|
| 2,040,156 | Slack et al. | May 12, 1936 |
| 2,119,069 | Bouwers | May 31, 1938 |
| 2,148,000 | Verhoeff | Feb. 21, 1939 |
| 2,266,174 | De Graaf | Dec. 16, 1941 |
| 2,683,766 | Cunningham | July 13, 1954 |

OTHER REFERENCES

"Rubber Modified Epoxy Casting Resins" article, in Electrical Manufacturing, December 1952, pages 127–128.